(12) United States Patent
Son

(10) Patent No.: US 11,794,546 B1
(45) Date of Patent: Oct. 24, 2023

(54) APPARATUS FOR ADJUSTING VEHICLE HEIGHT

(71) Applicant: HYUNDAI MOBIS CO., LTD., Seoul (KR)

(72) Inventor: Hee Hoon Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/065,591

(22) Filed: Dec. 13, 2022

(30) Foreign Application Priority Data

Jun. 30, 2022 (KR) ........................ 10-2022-0080369

(51) Int. Cl.
*B60G 17/052* (2006.01)

(52) U.S. Cl.
CPC .... *B60G 17/0525* (2013.01); *B60G 2202/152* (2013.01); *B60G 2800/01* (2013.01); *B60G 2800/912* (2013.01)

(58) Field of Classification Search
CPC .......... B60G 17/0525; B60G 2202/152; B60G 2800/01; B60G 2800/912
See application file for complete search history.

(56) References Cited

U.S. PATENT DOCUMENTS

| | | | | |
|---|---|---|---|---|
| 3,173,671 A * | 3/1965 | Broadwell | ............. | B60G 17/04 180/41 |
| 3,623,746 A * | 11/1971 | Zielinski | ................ | B60G 13/14 222/401 |
| 6,679,504 B2 * | 1/2004 | Delorenzis | ................ | F16F 5/00 280/5.512 |
| 6,959,932 B2 * | 11/2005 | Svartz | ................... | B60G 17/04 280/6.151 |
| 7,475,883 B2 * | 1/2009 | Christophel | ......... | B60G 17/021 280/5.514 |
| 7,578,513 B2 * | 8/2009 | Yonekura | ................. | B60G 7/04 267/51 |
| 7,922,181 B2 * | 4/2011 | Hakui | .................. | B60G 17/052 280/5.514 |

(Continued)

FOREIGN PATENT DOCUMENTS

KR  10-1013977  2/2011

OTHER PUBLICATIONS

English Language Abstract of KR 10-1013977 published Feb. 14, 2011.

*Primary Examiner* — Paul N Dickson
*Assistant Examiner* — Shams Dhanani
(74) *Attorney, Agent, or Firm* — DLA PIPER LLP (US)

(57) ABSTRACT

An apparatus for adjusting a vehicle height, the apparatus including a cylinder coupled to a suspension arm and having a pressure chamber therein, a hollow cylinder cap coupled to the cylinder, a first piston disposed to be movable upward or downward in the pressure chamber and having a lifting hole portion penetratively formed, a second piston disposed to be movable upward or downward in the lifting hole portion and having an upper portion to which a leaf spring seating part on which a leaf spring is seated is coupled, and a height adjustment unit connected to the cylinder and configured to selectively adjust a height of at least any one of the first piston and the second piston by changing a pressure of a working fluid in the pressure chamber.

20 Claims, 10 Drawing Sheets

(56) References Cited

U.S. PATENT DOCUMENTS

| | | | | |
|---|---|---|---|---|
| 8,091,910 | B2* | 1/2012 | Hara | B62K 25/04 |
| | | | | 280/283 |
| 8,523,191 | B2* | 9/2013 | Yagiela | B60G 17/019 |
| | | | | 280/5.514 |
| 8,770,592 | B2* | 7/2014 | Cox | B60G 17/0272 |
| | | | | 280/124.179 |
| 8,789,834 | B1* | 7/2014 | Turner | B60G 21/073 |
| | | | | 280/5.514 |
| 10,252,593 | B2* | 4/2019 | Fida | B60G 17/017 |
| 2007/0210539 | A1* | 9/2007 | Hakui | B60G 15/063 |
| | | | | 280/124.147 |
| 2009/0236807 | A1* | 9/2009 | Wootten | B60G 17/048 |
| | | | | 280/5.514 |
| 2011/0214956 | A1* | 9/2011 | Marking | F16F 9/34 |
| | | | | 188/313 |
| 2012/0187640 | A1* | 7/2012 | Kondo | B60G 13/14 |
| | | | | 280/5.514 |
| 2013/0328277 | A1* | 12/2013 | Ryan | B60G 17/0165 |
| | | | | 280/5.519 |
| 2014/0125018 | A1* | 5/2014 | Brady | B60G 17/016 |
| | | | | 280/5.519 |
| 2014/0260233 | A1* | 9/2014 | Giovanardi | B60G 17/016 |
| | | | | 60/431 |
| 2015/0081171 | A1* | 3/2015 | Ericksen | F16F 9/5126 |
| | | | | 701/37 |
| 2015/0151600 | A1* | 6/2015 | Suzuki | B60G 17/0565 |
| | | | | 280/5.514 |
| 2015/0360531 | A1* | 12/2015 | Kim | B60G 17/027 |
| | | | | 74/89.33 |
| 2018/0010666 | A1* | 1/2018 | Marking | B60G 13/06 |
| 2020/0030755 | A1* | 1/2020 | Hardy | B01F 35/2115 |
| 2021/0268857 | A1* | 9/2021 | D'Orazio | B60G 15/062 |

\* cited by examiner

APPARATUS FOR ADJUSTING VEHICLE HEIGHT

CROSS-REFERENCE TO RELATED APPLICATION

This application claims the benefit under 35 U.S.C. § 119(a) of priority to Korean Patent Application No. 10-2022-0080369 filed on Jun. 30, 2022 in the Korean Intellectual Property Office, the entire disclosure of which is incorporated herein by reference for all purposes.

BACKGROUND

Field

Exemplary embodiments of the present disclosure relate to an apparatus for adjusting a vehicle height, and more particularly, to an apparatus for adjusting a vehicle height that may adjust a vehicle height to various levels by using hydraulic pressure and have a reduced volume, which may reduce interference with a suspension structure.

Discussion of the Background

In general, a vehicle body of a vehicle is supported by a suspension system connected to wheels. The suspension system serves to absorb various types of vibration and impact occurring during the traveling of the vehicle, thereby improving ride quality and adjusting overall balance of the vehicle body in accordance with a state of a road surface. In addition, the suspension system serves to allow a driver to ensure stable maneuverability against a centrifugal force occurring when the vehicle turns. The suspension system also serves to prevent the vehicle body from being inclined by the centrifugal force.

To obtain the above-mentioned effects of the suspension system, the suspension system adopts a leaf spring typically configured by using a spring steel sheet, a coiled spring wound roundly in a coil shape, or an air suspension.

Among the above-mentioned springs, the leaf spring is mainly applied to a suspension system for a commercial vehicle and serves as a structure member that is a part of the suspension system. The leaf spring generates a reaction force to support a relative vertical motion of a vehicle body frame, thereby serving to determining ride quality and preventing an external force from being transmitted directly to the vehicle body frame.

Among the leaf springs applied to the suspension system for a vehicle, a leaf spring, which is installed to connect the left and right suspension systems in a transverse direction with respect to a forward/rearward direction of the vehicle body, is called a transverse leaf spring.

Meanwhile, it is advantageous to decrease a height of the vehicle body to reduce air resistance when the vehicle travels at high speed, and it is advantageous to increase the height of the vehicle body to prevent damage to the vehicle body when the vehicle travels on a rough road surface. Therefore, an apparatus for adjusting a vehicle height has been developed, which may variably adjust a height of the vehicle body to cope with various traveling environments.

However, the apparatus for adjusting a vehicle height in the related art causes excessive volumes and weights of necessary components because the apparatus uses pneumatic pressure. Even though an electric apparatus is applied, the electric apparatus requires a space in which separate components are to be installed to adjust the vehicle height.

Accordingly, there is a need for a structure capable of reducing a volume of the structure while increasing the number of stages for adjusting a vehicle height.

The background technology of the present disclosure is disclosed in Korean Patent No. 10-1013977 (published on Feb. 14, 2011, and entitled 'Apparatus for Adjusting Vehicle Height of Vehicle').

SUMMARY

Various embodiments are directed to an apparatus for adjusting a vehicle height that may adjust a vehicle height to various levels by using hydraulic pressure and have a reduced volume, which may reduce interference with a suspension structure.

In an embodiment, an apparatus for adjusting a vehicle height includes: a cylinder coupled to a suspension arm and having a pressure chamber therein; a hollow cylinder cap coupled to the cylinder; a first piston disposed to be movable upward or downward in the pressure chamber and having a lifting hole portion penetratively formed; a second piston disposed to be movable upward or downward in the lifting hole portion and having an upper portion to which a leaf spring seating part on which a leaf spring is seated is coupled; and a height adjustment unit connected to the cylinder and configured to selectively adjust a height of at least any one of the first piston and the second piston by changing a pressure of a working fluid in the pressure chamber.

In the present disclosure, the height adjustment unit may provide primary pressure to the pressure chamber so that the first piston and the second piston move upward together to a first height, or the height adjustment unit may provide secondary pressure to the pressure chamber so that the second piston moves upward to a second height higher than the first height.

In the present disclosure, a first stopper may protrude from an outer surface of the first piston, and a first catching projection may be formed on an inner surface of the cylinder cap and restrict an upward movement of the first stopper when the first piston is moved upward to the first height and positioned.

In the present disclosure, the apparatus may further include a ring-shaped outer hydraulic seal positioned above the first catching projection and provided inside the cylinder cap, in which the outer hydraulic seal is installed between the cylinder cap and the first piston.

In the present disclosure, the apparatus may further include a ring-shaped outer hydraulic seal positioned below the first stopper and provided outside the first piston, in which the outer hydraulic seal is installed between the cylinder and the first piston and moves upward or downward together with the first piston.

In the present disclosure, a second stopper may protrude from an outer surface of the second piston, and a second catching projection may be formed on an inner surface of the first piston and restrict an upward movement of the second stopper when the second piston is moved upward to the second height and positioned.

In the present disclosure, a first accumulator may be disposed between the first piston and the second piston, and a second accumulator may be formed inside the second piston connected to the first accumulator through a passageway so that air flows between the first accumulator and the second accumulator.

In the present disclosure, the first accumulator may be disposed in a section between the second stopper and the second catching projection.

In the present disclosure, the apparatus may further include a ring-shaped inner hydraulic seal positioned below the second stopper and provided outside the second piston, in which the inner hydraulic seal is installed between the first piston and the second piston and moves upward or downward together with the second piston.

In the present disclosure, the apparatus may further include a ring-shaped inner dust seal positioned above the second catching projection and provided inside the first piston, in which the inner dust seal is installed between the first piston and the second piston and moves upward or downward together with the first piston.

In the present disclosure, the apparatus may further include a ring-shaped outer dust seal provided inside the cylinder cap and positioned above the cylinder cap, in which the outer dust seal is installed between the cylinder cap and the first piston.

In the present disclosure, the height adjustment unit may include: a working fluid transmission line connected to the cylinder and configured to allow the working fluid to flow therethrough; a pump configured to supply the working fluid to the pressure chamber or discharge the working fluid from the pressure chamber through the working fluid transmission line; and a controller configured to control an operation of the pump.

In the present disclosure, a detector may be further electrically connected to the controller and detect pumping pressure of the pump.

In the present disclosure, the apparatus may include a bushing member installed on an inner surface of the cylinder cap and disposed to be in close contact with an outer surface of the first piston.

In the present disclosure, a first guide member may be provided on an inner surface of the first piston, disposed to be in close contact with an outer surface of the second piston, and configured to move upward or downward together with the first piston, and a second guide member may be provided on an outer surface of the first piston, disposed to be in close contact with an inner surface of the cylinder, and configured to move upward or downward together with the first piston.

In the present disclosure, a third guide member may be provided on an outer surface of the second piston, disposed to be in close contact with an inner surface of the first piston, and configured to move upward or downward together with the second piston.

In the present disclosure, a dust cover may be further coupled between an upper end of the cylinder and a lower end of the leaf spring seating part and configured to be variable in vertical length, the dust cover may surround a periphery of the second piston, a lower end of the dust cover may be coupled to the upper end of the cylinder, and an upper end of the dust cover may be coupled to the lower end of the leaf spring seating part.

In the present disclosure, a lateral end of the leaf spring seating part may protrude toward a lateral portion of the second piston, and a seating groove portion may be formed concavely downward inside the leaf spring seating part.

In the present disclosure, the apparatus may further include a leaf spring bushing accommodated in the seating groove portion, installed between the leaf spring seating part and the leaf spring, and configured to elastically support the leaf spring.

In the present disclosure, the apparatus may include a bushing rib protruding upward along a rim of an upper surface of the leaf spring bushing and configured to surround an outer surface of a free end of the leaf spring.

According to the present disclosure, it is possible to adjust the vehicle height to various levels (low, middle, and high levels) and reduce the volume of the apparatus by means of the telescopic structure that may reduce the volume, which makes it possible to reduce interference with the suspension structure. Further, it is possible to ensure the operating performance of the apparatus because no excessive pressure is generated between the first piston and the second piston at the time of adjusting the vehicle height.

DETAILED DESCRIPTION OF THE ILLUSTRATED EMBODIMENTS

Figure 1:
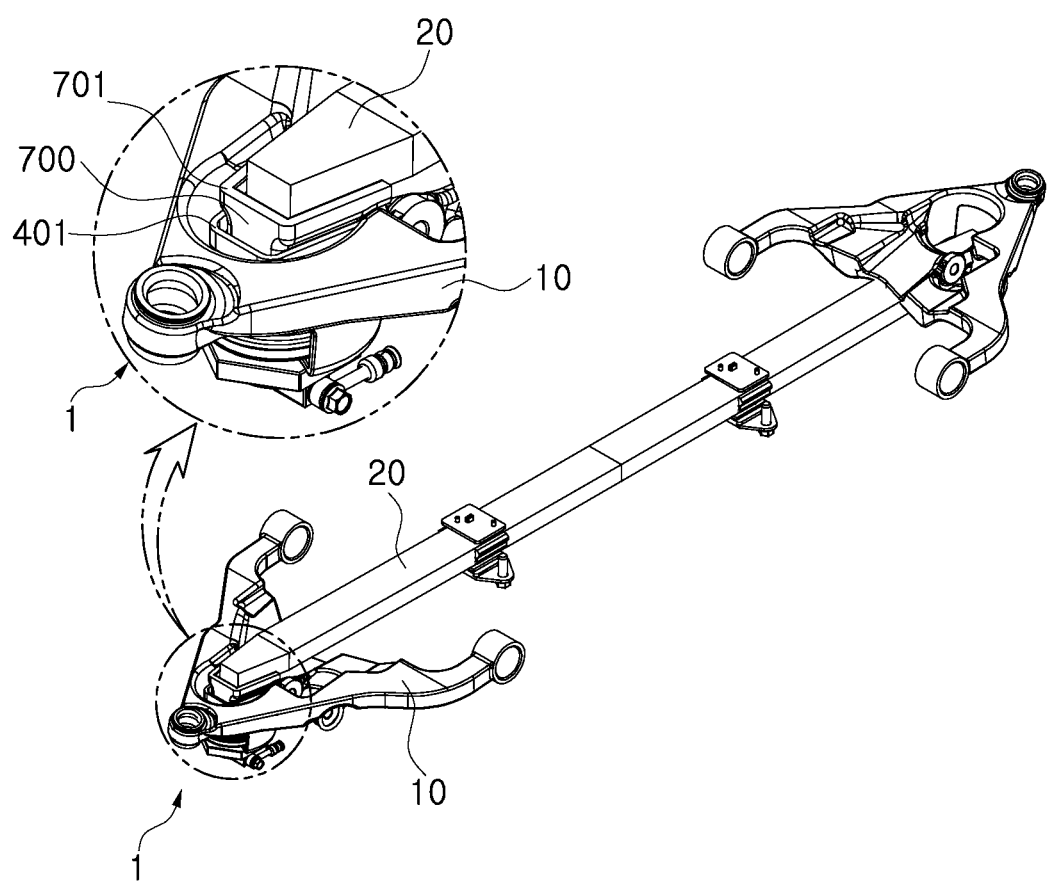
FIG. 1 is a perspective view illustrating an apparatus for adjusting a vehicle height according to an embodiment of the present disclosure when viewed from the top side.

Hereinafter, an apparatus for adjusting a vehicle height will be described below with reference to the accompanying drawings through various exemplary embodiments. Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

Figure 2:
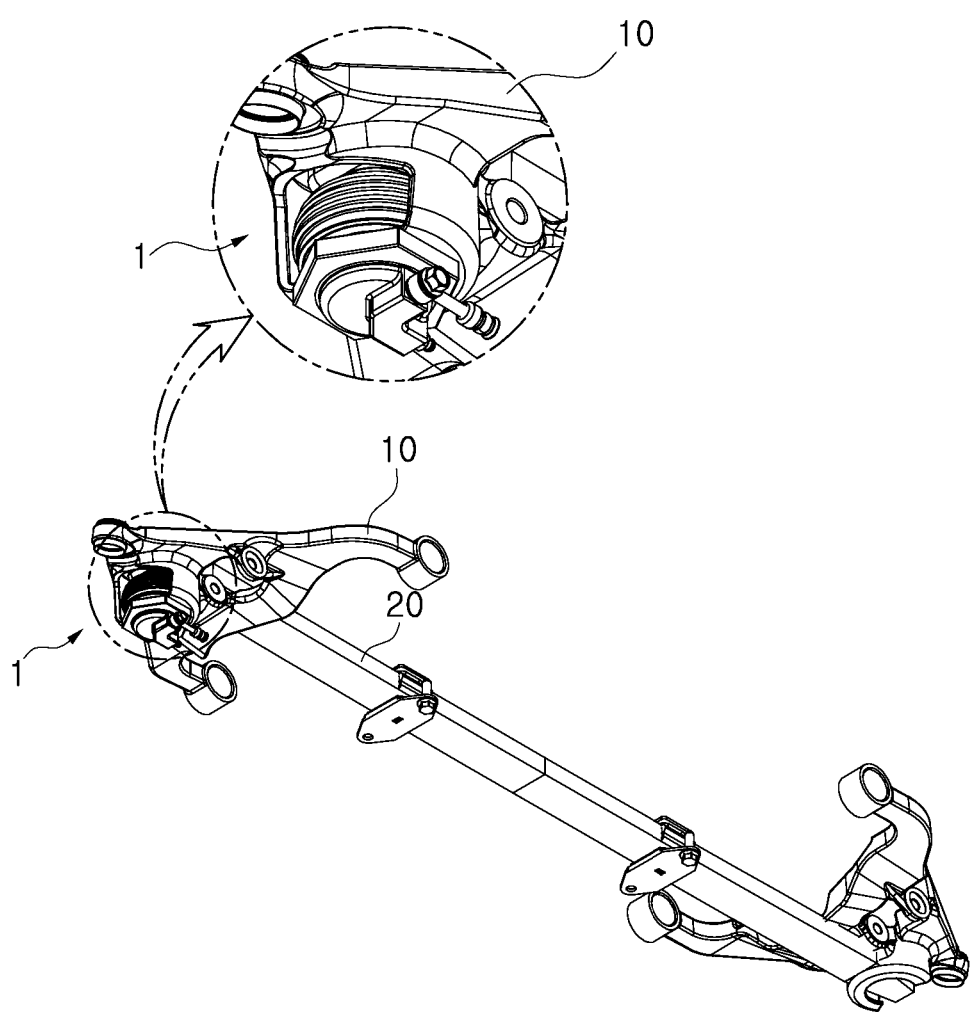
FIG. 2 is a perspective view illustrating the apparatus for adjusting a vehicle height according to the embodiment of the present disclosure when viewed from the bottom side.
Figure 3:
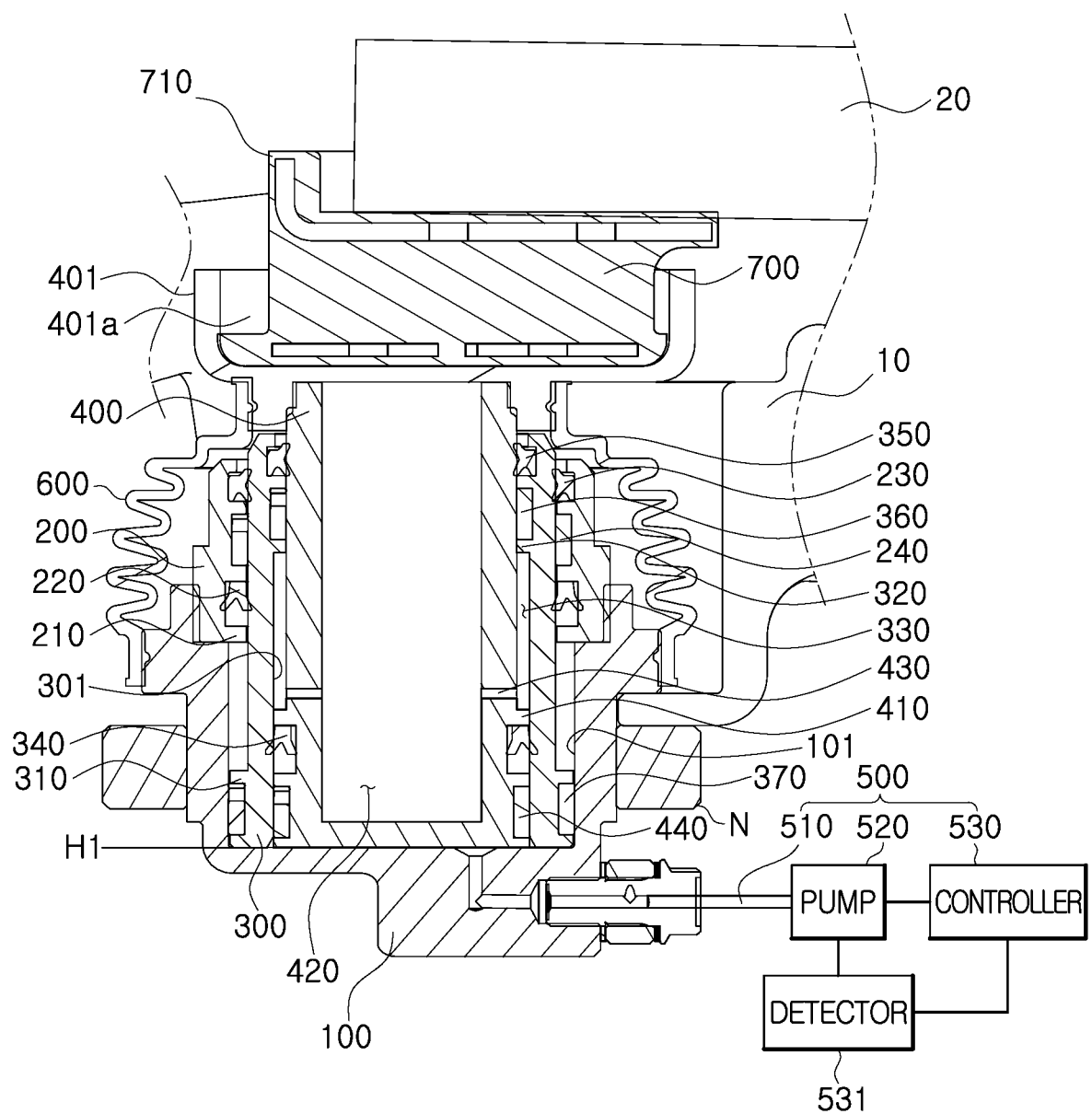
FIG. 3 is a cross-sectional side view illustrating the apparatus for adjusting a vehicle height according to the embodiment of the present disclosure.

FIG. 1 is a perspective view illustrating an apparatus for adjusting a vehicle height according to an embodiment of the present disclosure when viewed from the top side, FIG. 2 is a perspective view illustrating the apparatus for adjusting a vehicle height according to the embodiment of the present disclosure when viewed from the bottom side, and FIG. 3 is a cross-sectional side view illustrating the apparatus for adjusting a vehicle height according to the embodiment of the present disclosure.

Referring to FIGS. 1 to 3, an apparatus 1 for adjusting a vehicle height according to an embodiment of the present disclosure includes a cylinder 100, a cylinder cap 200, a first piston 300, a second piston 400, and a height adjustment unit 500. A total of four apparatuses 1 for adjusting a vehicle height may be respectively mounted at corners of a vehicle, one apparatus for each corner.

The cylinder 100 may be coupled to a suspension arm 10 of the vehicle. The cylinder 100 may be coupled to each of lower arms positioned at two opposite sides of front and rear wheels of the vehicle. The cylinder 100 may be coupled to the lower arm by means of a fastening member N such as a bolt or a nut. The cylinder 100 may have a pressure chamber 101 therein and have a structure opened at an upper end thereof.

The cylinder cap 200 may be fixedly coupled to the upper end of the cylinder 100. The cylinder cap 200 has a hollow shape and has a structure opened in an upward/downward direction. An outer peripheral portion of a lower end of the cylinder cap 200 may be mounted on an inner peripheral portion of the upper end of the cylinder 100.

The first piston 300 is disposed to be movable upward or downward in the pressure chamber 101 of the cylinder 100. The first piston 300 may have a shape corresponding to an inner peripheral surface of the pressure chamber 101. The upward or downward movement of the first piston 300 may be guided by the inner peripheral surface of the pressure chamber 101. The first piston 300 has therein a lifting hole portion 301 penetratively formed in the upward/downward direction. The second piston 400 is disposed inside the first piston 300 so as to be movable upward or downward along the lifting hole portion 301.

A first stopper 310 may protrude from an outer surface of the first piston 300. A first catching projection 210 may protrude from an inner surface of the cylinder cap 200. When the first piston 300 is moved upward to a first height H2 and positioned, the first stopper 310 may be caught by the first catching projection 210. That is, the additional upward movement of the first piston 300 is restricted when the first stopper 310 is caught by the first catching projection 210 after the first piston 300 moves upward to the first height H.

The first stopper 310 may protrude outward along an outer periphery of the first piston 300, and the first catching projection 210 may protrude inward along an inner periphery of the cylinder cap 200. The first stopper 310 and the first catching projection 210 may protrude in a horizontal direction.

The apparatus 1 for adjusting a vehicle height according to the present embodiment may include a ring-shaped outer hydraulic seal 220 positioned above the first catching projection 210 and provided inside the cylinder cap 200.

The outer hydraulic seal 220 may be manufactured by using a material such as rubber and installed between the cylinder cap 200 and the first piston 300. A concave installation groove may be formed in an inner surface of the cylinder cap 200 and accommodate the outer hydraulic seal 220. The outer hydraulic seal 220 may have a ring shape.

The outer hydraulic seal 220 may be fixedly installed inside the cylinder cap 200. The outer hydraulic seal 220 provides a sealing structure, which may prevent hydraulic pressure from leaking between the cylinder cap 200 and the first piston 300.

Referring to FIG. 3, the second piston 400 is disposed to be movable upward or downward in the lifting hole portion 301 of the first piston 300. The second piston 400 may have a shape corresponding to an inner peripheral surface of the first piston 300.

A leaf spring seating part 401 may be coupled to an upper end of the second piston 400, and an end of a leaf spring 20 may be seated on the leaf spring seating part 401. The leaf spring 20 may be a transversal type leaf spring made of metal or another type of leaf spring.

A lateral end of the leaf spring seating part 401 protrudes toward a lateral portion of the second piston 400. A seating groove portion 401a may be formed in the leaf spring seating part 401 and accommodate a leaf spring bushing 700.

The leaf spring bushing 700 is accommodated in the seating groove portion 401a. The leaf spring bushing 700 is installed between the leaf spring seating part 401 and the leaf spring 20. The leaf spring bushing 700 is disposed below the leaf spring 20 and elastically supports the leaf spring 20.

The leaf spring bushing 700 may have a bushing rib 710 protruding upward along a rim of an upper surface of the leaf spring bushing 700. The bushing rib 710 is configured to surround an outer surface of a free end of the leaf spring 20. The bushing rib 710 is seated on the leaf spring bushing 700 and serves as a stopper for preventing friction and slipping occurring while the wheel is displaced on the structure of the leaf spring 20.

A second stopper 410 may protrude from an outer surface of the second piston 400. A second catching projection 320 may protrude from an inner surface of the first piston 300. When the second piston 400 is moved upward to a second height H3 and positioned, the second stopper 410 may be caught by the second catching projection 320. That is, the additional upward movement of the second piston 400 is restricted when the second stopper 410 is caught by the second catching projection 320 after the second piston 400 moves upward to the second height H3.

The second stopper 410 may protrude outward along an outer periphery of the second piston 400, and the second catching projection 320 may protrude inward along an inner periphery of the first piston 300. The second stopper 410 and the second catching projection 320 may protrude in the horizontal direction.

A first accumulator 330 having a predetermined space may be disposed between the first piston 300 and the second piston 400. The first accumulator 330 may be disposed in a space between the second stopper 410 and the second catching projection 320.

A second accumulator 420 may be disposed inside the second piston 400. A passageway 430 may be formed in the second piston 400 so that the first accumulator 330 and the second accumulator 420 are connected.

The first accumulator 330 and the second accumulator 420 are the spaces in which air flows when the second piston 400 moves upward or downward.

Figure 7:
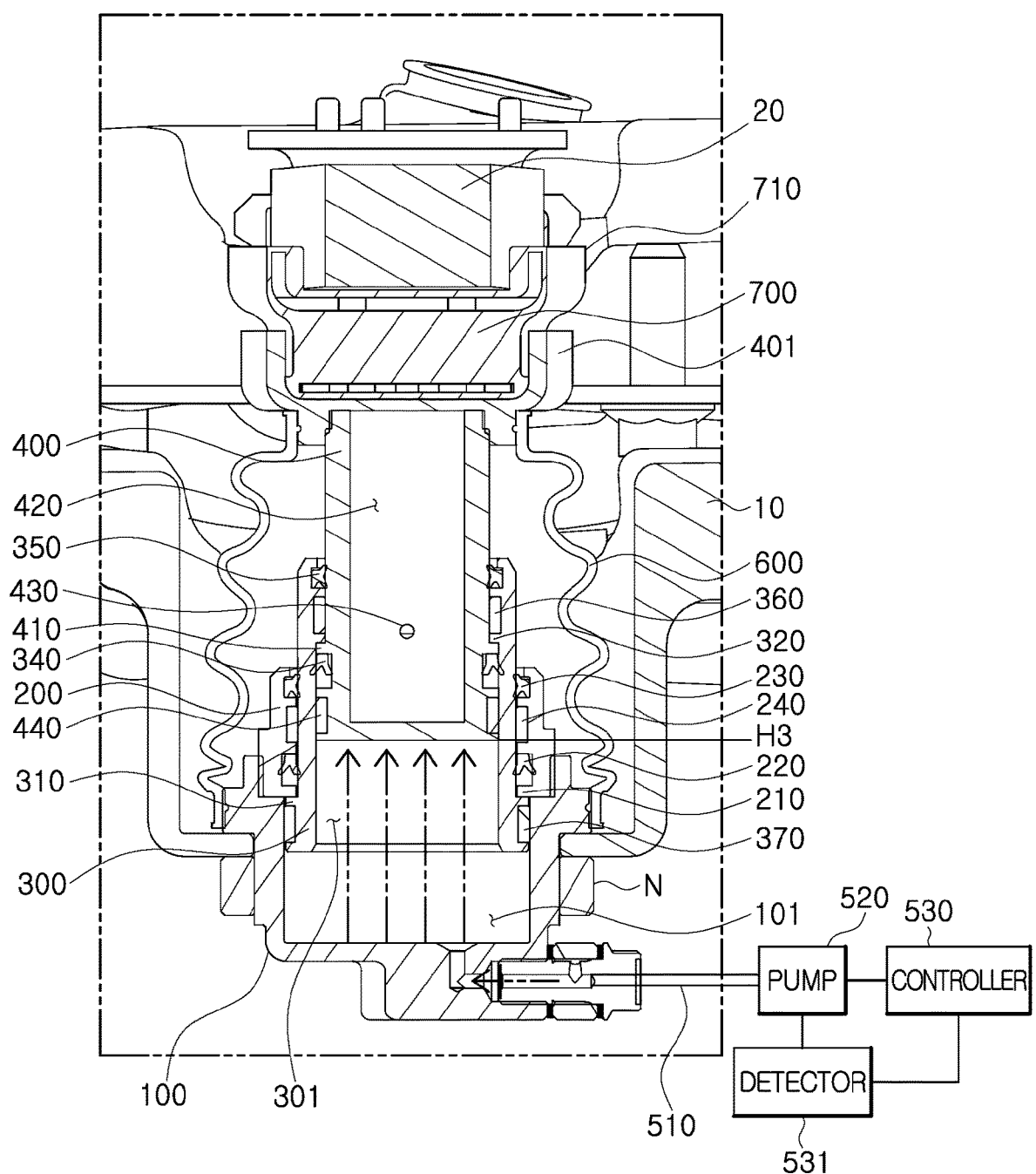
FIG. 7 is a cross-sectional front view illustrating a state in which the second piston is moved upward to a second height in the apparatus for adjusting a vehicle height according to the embodiment of the present disclosure.

Referring to FIG. 7, when the second piston 400 moves upward to the second height H3, the air in the first accumulator 330 flows to the second accumulator 420 through the passageway 430. On the contrary, referring to FIGS. 9 and 10, when the second piston 400 moves downward to the first height H2 or a reference height H1, the air in the second accumulator 420 flows to the first accumulator 330 through the passageway 430.

An inner hydraulic seal 340 may be disposed on the second piston 400 and move together with the second piston 400. An inner dust seal 350 may be fixed in position on the first piston 300 when the second piston 400 moves upward to the second height H3. Therefore, overpressure of air may be generated when a vehicle height is increased. To eliminate the overpressure of air, it is possible to increase a volume of air to be compressed through the passageway 430.

The apparatus 1 for adjusting a vehicle height according to the present embodiment may include the ring-shaped inner hydraulic seal 340 positioned below the second stopper 410 and disposed on the outer periphery of the second piston 400.

The inner hydraulic seal 340 may be manufactured by using a material such as rubber and installed between the first piston 300 and the second piston 400. A concave installation groove may be formed in the outer surface of the second piston 400 and accommodate the inner hydraulic seal 340. The inner hydraulic seal 340 may have a ring shape.

The inner hydraulic seal 340 moves upward or downward together with the second piston 400. The inner hydraulic seal 340 provides a sealing structure, which may prevent hydraulic pressure from leaking between the first piston 300 and the second piston 400.

The outer hydraulic seal 220 is fixedly installed inside the cylinder cap 200, and the inner hydraulic seal 340 may be installed to be movable upward or downward together with the second piston 400. Therefore, it is possible to minimize a difference in area between inner and outer pressure chambers (see FIGS. 6 and 7). That is, it is possible to minimize a difference between an inner area of the first piston 300 and an inner area of the second piston 400.

The apparatus 1 for adjusting a vehicle height according to the present embodiment may include the ring-shaped inner dust seal 350 positioned above the second catching projection 320 and disposed on the inner periphery of the first piston 300.

The inner dust seal 350 may be manufactured by using a material such as rubber and installed between the first piston 300 and the second piston 400. A concave installation groove may be formed in the outer surface of the second piston 400 and accommodate the inner dust seal 350. The inner dust seal 350 may have a ring shape.

The inner dust seal 350 moves upward or downward together with the first piston 300. The inner dust seal 350 provides a sealing structure, which may prevent foreign substances from being introduced between the first piston 300 and the second piston 400.

The apparatus 1 for adjusting a vehicle height according to the present embodiment may include a ring-shaped outer dust seal 230 provided on the inner periphery of the cylinder cap 200 and positioned on an upper portion of the cylinder cap 200.

The outer dust seal 230 may be manufactured by using a material such as rubber and installed between the cylinder cap 200 and the first piston 300. A concave installation groove may be formed in the inner surface of the cylinder cap 200 and accommodate the outer dust seal 230. The outer dust seal 230 may have a ring shape.

The outer dust seal 230 may be fixed inside the cylinder cap 200. The outer dust seal 230 provides a sealing structure, which may prevent foreign substances from being introduced between the cylinder cap 200 and the first piston 300.

The height adjustment unit 500 is connected to the pressure chamber 101 of the cylinder 100 and configured to inject and discharge a working fluid. The height adjustment unit 500 selectively adjusts heights of the first and second pistons 300 and 400 by changing an injection pressure of the working fluid.

When the working fluid is injected into the pressure chamber 101 by an operation of the height adjustment unit 500, a primary pressure is generated as a level of the working fluid in the pressure chamber 101 is increased. Therefore, the first piston 300 and the second piston 400 move upward to the first height H2.

When the working fluid is additionally injected into the pressure chamber 101, a secondary pressure is generated as the level of the working fluid in the pressure chamber 101 is further increased. Therefore, the second piston 400 moves upward to the second height H3.

The height adjustment unit 500 may include a working fluid transmission line 510, a pump 520, and a controller 530.

The working fluid transmission line 510 is a flow path that connects a working fluid storage (not illustrated) and the pressure chamber 101 of the cylinder 100.

The pump 520 may be disposed in the working fluid transmission line 510 or connected to the working fluid transmission line 510 and configured to transmit the pressure. The pump 520 supplies the working fluid to the pressure chamber 101 through the working fluid transmission line 510 or discharges the working fluid in the pressure chamber 101 to the outside through the working fluid transmission line 510.

During the process of increasing the vehicle height, the pump 520 may operate in a mode (see FIG. 6) in which the pump 520 raises the first piston 300 and the second piston 400 to the first height H2 or a mode (see FIG. 7) in which the pump 520 raises the second piston 400 to the second height H3. To increase the vehicle height, the pump 520 may primarily supply the working fluid to the pressure chamber 101 and additionally and secondarily supply the working fluid to the pressure chamber 101.

During the process of decreasing the vehicle height, the pump 520 may operate in a mode (see FIG. 9) in which the pump 520 lowers the second piston 400 to the first height H2 or a mode (see FIG. 10) in which the pump 520 lowers the first piston 300 and the second piston 400 to the reference height H1. To decrease the vehicle height, the pump 520 may primarily discharge the working fluid in the pressure chamber 101 or additionally and secondarily discharge the working fluid in the pressure chamber 101.

The pump 520 may be provided for each of the front and rear wheels of the vehicle. Alternatively, the integrated single pump 520 may be applied to the front and rear wheels.

The controller 530 may control an operation of the pump 520. A detector 531 may be further electrically connected to the controller 530 and detect a pumping pressure of the pump 520.

The detector 531 may detect the pumping pressure of the pump 520 and transmit a pressure detection signal to the controller 530. The controller 530 may receive the detection signal from the detector 531 and identify the operation mode of the pump 520. The detector 531 serves to measure a value of the current vehicle height of the vehicle. The single detector 531 may be provided in the vehicle. Alternatively, the detector 531 may be provided at each of the front and rear wheels. Alternatively, a total of four detectors 531 may be provided at two opposite sides of the front wheel and two opposite sides of the rear wheel.

The height adjustment unit 500 may be mounted in an engine room or at a lower end of a trunk.

The apparatus 1 for adjusting a vehicle height according to the embodiment of the present disclosure may include a bushing member 240 installed on the inner surface of the cylinder cap 200 and disposed to be in close contact with the outer surface of the first piston 300.

The bushing member 240 may be positioned between the outer hydraulic seal 220 and the outer dust seal 230. A concave installation groove may be formed in the inner surface of the cylinder cap 200 and accommodate the bushing member 240. The bushing member 240 may be fixed inside the cylinder cap 200.

Because the cylinder cap 200 does not move upward when the first piston 300 moves upward to the first height H2, the bushing member 240 fixed in position on the cylinder cap 200 guides the upward movement of the first piston 300. In addition, when the first piston 300 moves downward from the first height H2 to the reference height H1, the bushing member 240 fixed in position on the cylinder cap 200 guides the downward movement of the first piston 300. Therefore, the bushing member 240 guides the upward or downward movement of the first piston 300 when the first piston 300 moves upward or downward along the inner surface of the cylinder cap 200. The bushing member 240 may have a ring shape.

The apparatus 1 for adjusting a vehicle height according to the embodiment of the present disclosure may include at least one of a first guide member 360, a second guide member 370, and a third guide member 440. That is, the apparatus 1 for adjusting a vehicle height may include the first guide member 360, the second guide member 370, or the third guide member 440. The apparatus 1 for adjusting a vehicle height may include two or more of the first guide member 360, the second guide member 370, and the third guide member 440 or include all the first guide member 360, the second guide member 370, and the third guide member 440.

The first guide member 360 may be manufactured by using a material such as a resin-based material. The first guide member 360 is provided on the inner surface of the first piston 300 and disposed to be in close contact with the outer surface of the second piston 400. The first guide member 360 may be positioned between the second catching projection 210 and the inner dust seal 350. A concave installation groove may be formed in the inner surface of the first piston 300 and accommodate the first guide member 360. The first guide member 360 moves upward or downward together with the first piston 300.

Because the first piston 300 does not move upward when the second piston 400 singly moves upward to the second height H3, the first guide member 360 fixed in position on the first piston 300 guides the upward movement of the second piston 400. In addition, when the second piston 400 moves downward from the second height H3 to the first height H2, the first guide member 360 fixed in position on the first piston 300 guides the downward movement of the second piston 400. Therefore, the first guide member 360 guides the upward or downward movement of the second piston 400 when the second piston 400 moves upward or downward along the inner surface of the first piston 300. The first guide member 360 may have a ring shape.

The second guide member 370 may be manufactured by using a material such as a resin-based material. The second guide member 370 is provided on the outer surface of the first piston 300 and disposed to be in close contact with the inner surface of the cylinder 100. The second guide member 370 may be positioned below the first stopper 310. A concave installation groove may be formed in the outer surface of the first piston 300 and accommodate the second guide member 370. The second guide member 370 slides upward or downward together with the first piston 300. When the first piston 300 moves upward to the first height H2, the first guide member 360 also slides on the inner surface of the cylinder 100 while moving upward together with the first piston 300. When the first piston 300 moves downward from the first height H2 to the reference height H1, the first guide member 360 also moves downward along the inner surface of the cylinder 100 while moving downward together with the first piston 300. Therefore, when the first piston 300 moves upward or downward along the inner surface of the cylinder 100, the second guide member 370 guides the upward or downward movement of the first piston 300. The second guide member 370 may have a ring shape.

The third guide member 440 may be manufactured by using a material such as a resin-based material. The third guide member 440 is provided on the outer surface of the second piston 400 and disposed to be in close contact with the inner surface of the first piston 300. The third guide member 440 may be positioned below the inner hydraulic seal 340. A concave installation groove may be formed in the outer surface of the second piston 400 and accommodate the third guide member 440. The third guide member 440 slides upward or downward together with the second piston 400. When the second piston 400 moves upward to the second height H3, the third guide member 440 also slides on the inner surface of the first piston 300 while moving upward together with the second piston 400. When the second piston 400 moves downward from the second height H3 to the first height H2, the third guide member 440 also moves downward along the inner surface of the first piston 300 while moving downward together with the second piston 400. Therefore, the third guide member 440 guides the upward or downward movement of the second piston 400 when the second piston 400 moves upward or downward along the inner surface of the first piston 300. The third guide member 440 may have a ring shape.

The apparatus 1 for adjusting a vehicle height according to the embodiment of the present disclosure may include a dust cover 600 coupled between the upper end of the cylinder 100 and the lower end of the leaf spring seating part 401 and configured to be variable in vertical length.

The dust cover 600 may surround a periphery of the second piston 400. A lower end of the dust cover 600 may be coupled to the upper end of the cylinder 100, and an upper end of the dust cover 600 may be coupled to the lower end of the leaf spring seating part 401. The dust cover 600 may be provided in the form of a corrugated pipe that is folded or unfolded in the upward/downward direction so that the length of the dust cover 600 may be changed in the upward/downward direction in accordance with an upward or downward movement height of the second piston 400.

An operating process of the apparatus for adjusting a vehicle height according to the embodiment of the present disclosure configured as described above will be described below.

Figure 5:
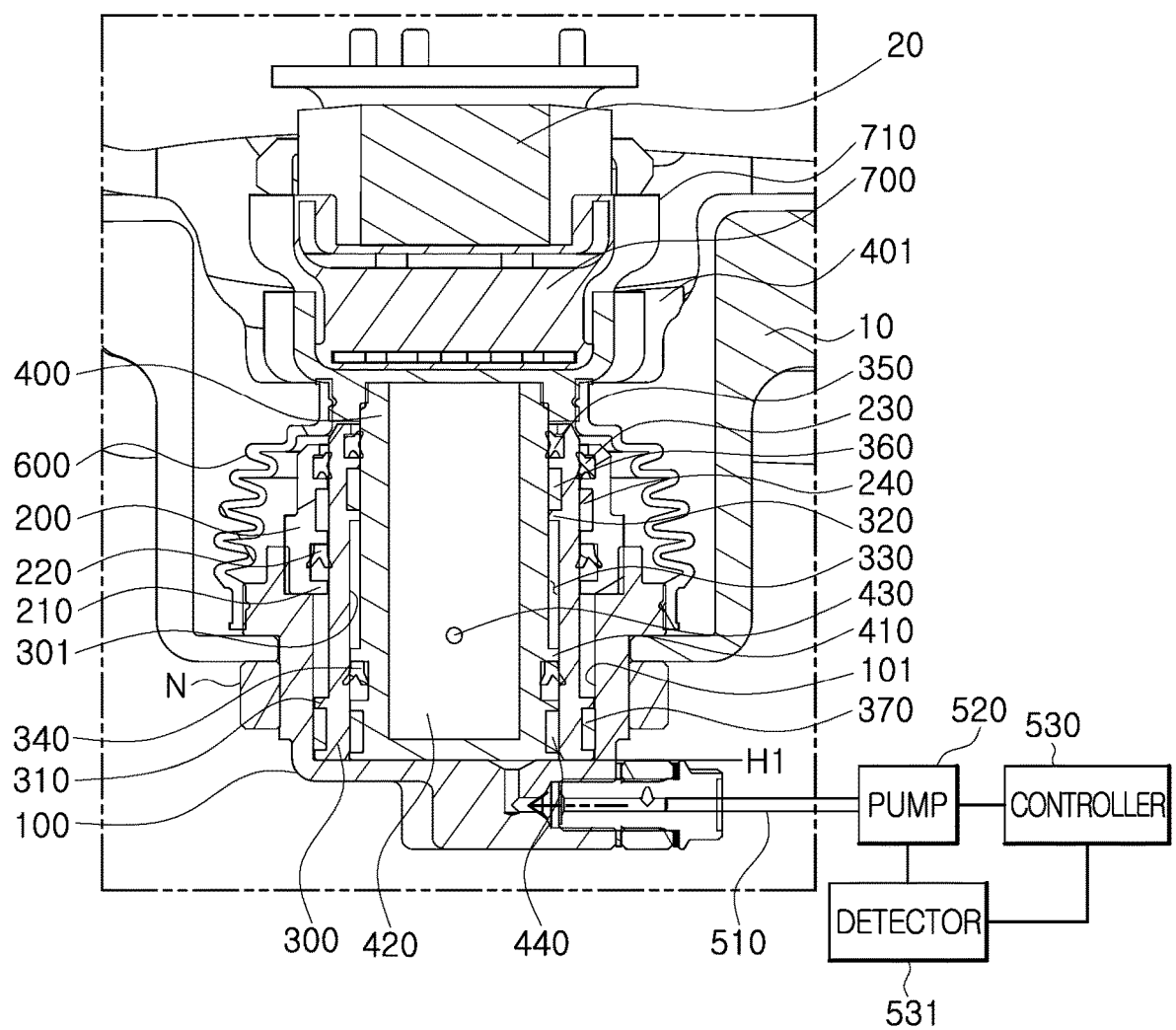
FIG. 5 is a cross-sectional front view illustrating a reference height defined before first and second pistons move upward in the apparatus for adjusting a vehicle height according to the embodiment of the present disclosure.
Figure 6:
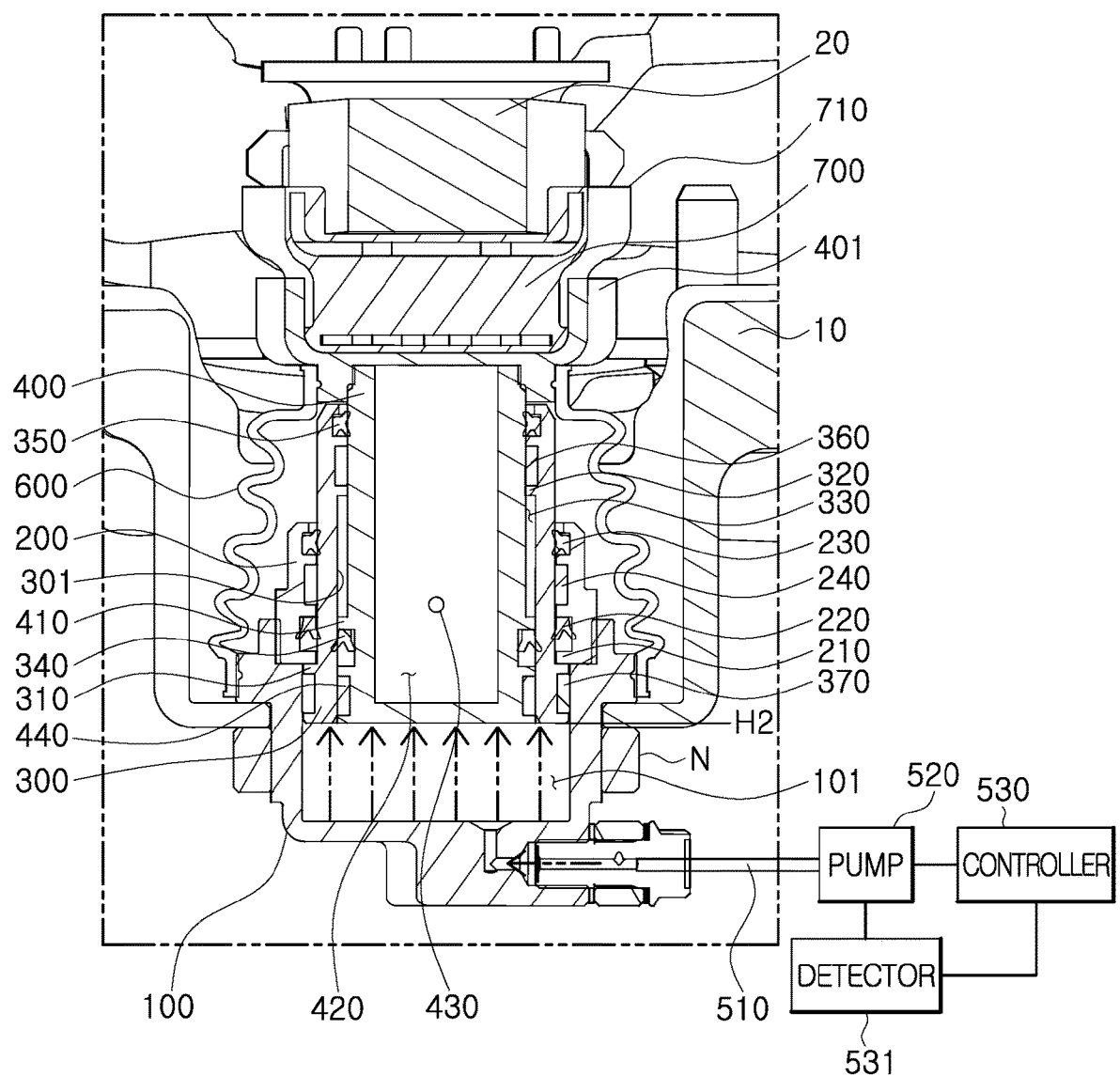
FIG. 6 is a cross-sectional front view illustrating a state in which the first and second pistons are moved upward to a first height in the apparatus for adjusting a vehicle height according to the embodiment of the present disclosure.

FIG. 5 is a cross-sectional front view illustrating the reference height defined before the first and second pistons move upward in the apparatus for adjusting a vehicle height according to the embodiment of the present disclosure, FIG. 6 is a cross-sectional front view illustrating a state in which the first and second pistons are moved upward to the first height in the apparatus for adjusting a vehicle height according to the embodiment of the present disclosure, and FIG. 7 is a cross-sectional front view illustrating a state in which the second piston is moved upward to the second height in the apparatus for adjusting a vehicle height according to the embodiment of the present disclosure.

Referring to FIG. 5, in case that the pump 520 does not pump the working fluid, i.e., the working fluid is not supplied to the pressure chamber 101, the first piston 300 and the second piston 400 are positioned in the state in which the first piston 300 and the second piston 400 are moved downward to the reference height H1. In this state, no pressure for the upward movement is generated at the lower side of the pressure chamber 101, and the leaf spring 20 is positioned at the lowest reference height H1 in the state in which the leaf spring 20 is supported on the upper side of the second piston 400. In this case, the height of the vehicle, i.e., the vehicle height is lowest.

Referring to FIG. 6, in case that the pump 520 pumps the working fluid by using primary pressure and injects the working fluid into the lower portion of the pressure chamber 101, the level of the working fluid in the pressure chamber 101 increases, a cross-sectional area of the lower portion of the pressure chamber 101 increases, and the primary pressure is formed. In this case, the lower portion of the pressure chamber 101 is filled with the working fluid at the primary pressure, and the first piston 300 and the second piston 400 are moved upward together to the first height H2 by the primary pressure generated in the lower portion of the pressure chamber 101.

In this process, the second guide member 370 slides upward in the state in which the second guide member 370 is in close contact with the inner peripheral surface of the pressure chamber 101, and the vertical length of the dust cover 600 is increased by the upward movement of the second piston 400. In this state, the leaf spring 20 is fixedly positioned at the first height H2 by moving upward primarily in the state in which the leaf spring 20 is supported on the upper side of the second piston 400. Further, the first stopper 310 is positioned at and caught by the lower end of the first catching projection 210, such that the additional upward movement of the first piston 300 is restricted.

When the first piston 300 and the second piston 400 move upward to the first height H2, the leaf spring seating part 401, which is coupled to the upper end of the second piston 400, also moves upward by the same distance. As a result, the vehicle height is also raised by the same distance.

The detector 531 measures the value of the current vehicle height. Therefore, when the vehicle height increases and reaches a desired position, a driver may stop the increase in vehicle height at the corresponding position by controlling the operation of the pump 520 by using the controller 530.

Referring to FIG. 7, in case that the pump 520 pumps the working fluid by using secondary pressure and injects the working fluid into the lower portion of the pressure chamber 101, the level of the working fluid in the pressure chamber 101 further increases, the cross-sectional area of the lower portion of the pressure chamber 101 further increases, and the secondary pressure is formed. In this case, the lower portion of the pressure chamber 101 is filled with the working fluid at the secondary pressure, and the second piston 400 is singly moved upward to the second height H3 by the secondary pressure generated in the lower portion of the pressure chamber 101. Even though the secondary pressure is generated in the pressure chamber 101 by the additionally supplied working fluid, the first piston 300 remains at the first height H2 without moving upward any further because the first stopper 310 is caught by the first catching projection 210. Therefore, the second piston 400 singly moves upward to the second height H3 when the working fluid is supplied additionally.

In this process, the third guide member 440 slides upward in the state in which the third guide member 440 is in close contact with the inner peripheral surface of the lifting hole portion 301, and the vertical length of the dust cover 600 is increased by the upward movement of the second piston 400. In this state, the leaf spring 20 is fixedly positioned at the second height H3 by moving upward secondarily in the state in which the leaf spring 20 is supported on the upper side of the second piston 400. Further, the second stopper 410 is positioned at and caught by the lower end of the second catching projection 320, such that the additional upward movement of the second piston 400 is restricted.

When the second piston 400 moves upward to the second height H3, the leaf spring seating part 401, which is coupled to the upper end of the second piston 400, also moves upward by the same distance. As a result, the vehicle height is also raised by the same distance.

The detector 531 measures the value of the current vehicle height. Therefore, when the vehicle height increases and reaches a desired position, the driver may stop the increase in vehicle height at the corresponding position by controlling the operation of the pump 520 by using the controller 530.

The pump 520 may further include a pressure sensor. The secondary pressure higher than the primary pressure needs to be provided to raise the second piston 400 from the first height H2 to the second height H3. Therefore, a larger amount of working fluid needs to be supplied into the pressure chamber 101 to apply the secondary pressure. Therefore, the pump 520 may use the pressure sensor and detect whether the secondary pressure higher than the primary pressure is provided, and the pump 520 may adjust the amount of working fluid to be provided to the pressure chamber 101 on the basis of the detection result.

To cope with the lateral force of the leaf spring 20 generated by friction and slipping occurring while the wheel is displaced on the structure of the leaf spring 20 in the state in which the leaf spring 20 is seated on the leaf spring bushing 700, the bushing member 240 and the second guide member 370 may define one support point, and the first guide member 360 and the third guide member 440 may define one support point.

That is, when the first piston 300 moves upward or downward, the bushing member 240 fixed in position on the cylinder cap 200 may guide the movement of the first piston 300, and the second guide member 370 may come into close contact with the inner surface of the cylinder 100, thereby inhibiting the first piston 300 from swaying when moving.

When the second piston 400 moves upward, the first guide member 360 fixed in position on the first piston 300 may guide the movement of the second piston 400, and the third guide member 440 may come into close contact with the inner surface of the first piston 300, thereby inhibiting the second piston 400 from swaying when moving.

Figure 8:
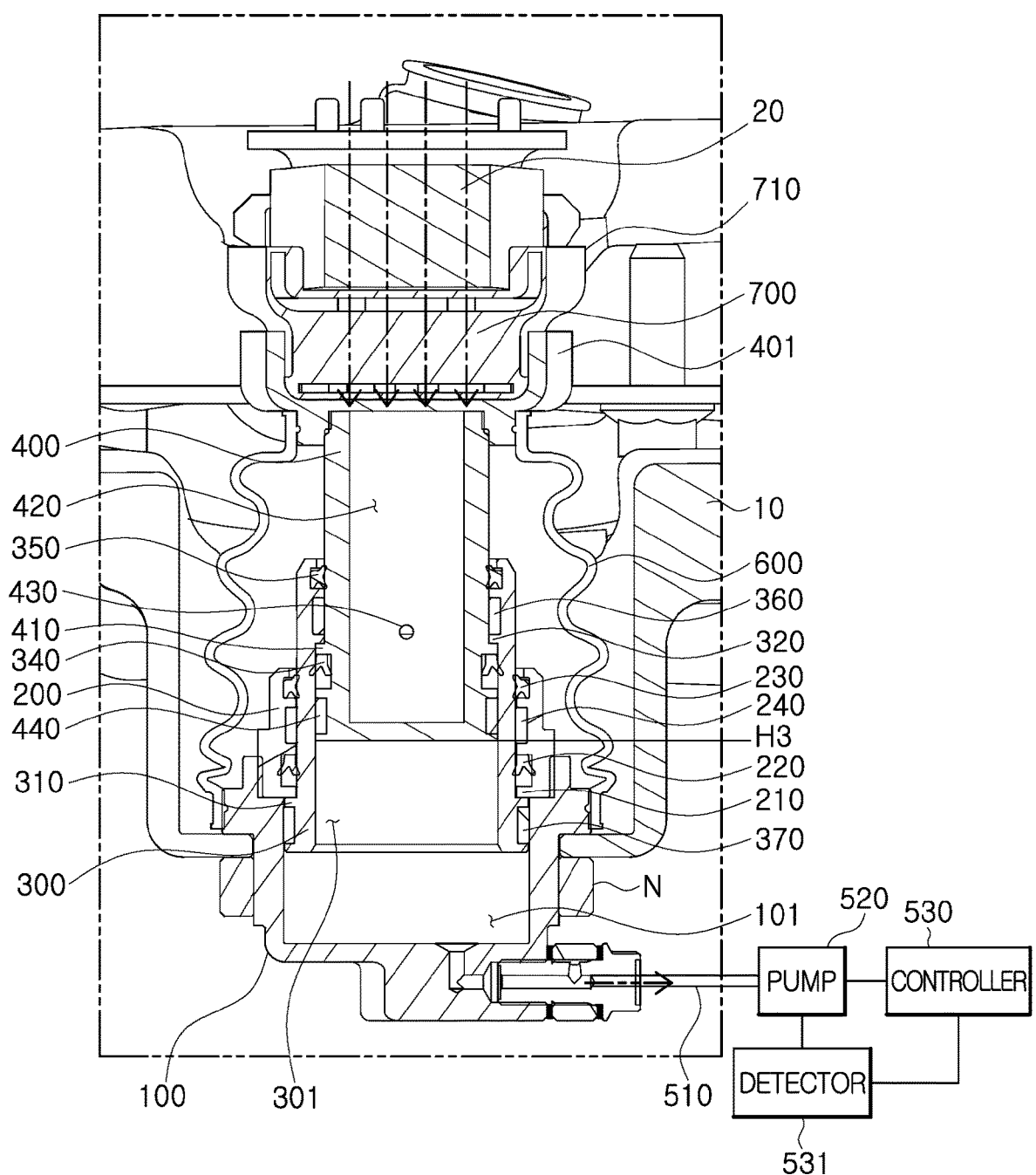
FIG. 8 is a cross-sectional front view illustrating a state defined before the first piston, which has moved upward to the first height, and the second piston, which has moved upward to the second height, move downward in the apparatus for adjusting a vehicle height according to the embodiment of the present disclosure.
Figure 9:
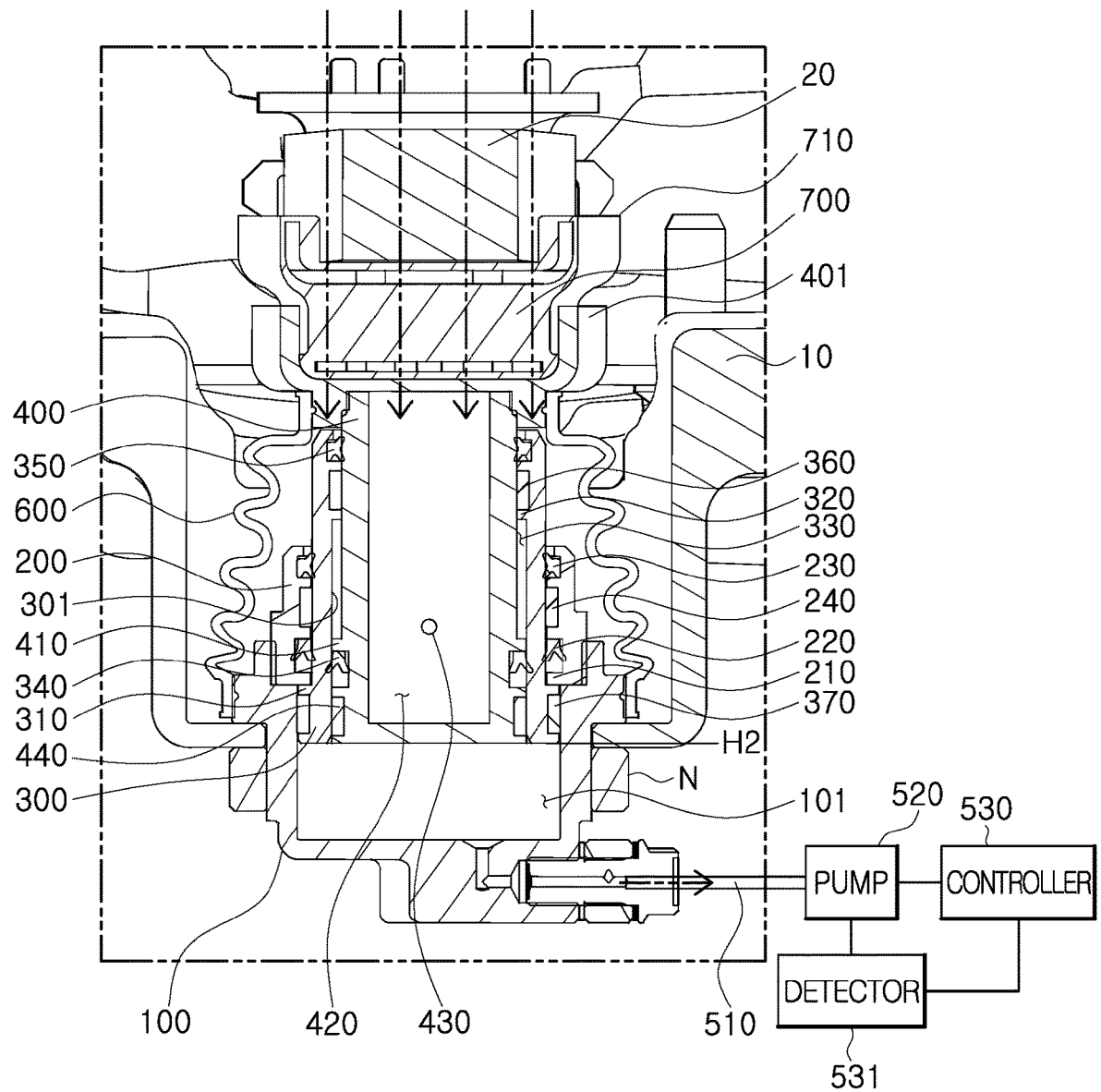
FIG. 9 is a cross-sectional front view illustrating a state in which the second piston is moved downward to the first height in the apparatus for adjusting a vehicle height according to the embodiment of the present disclosure.
Figure 10:
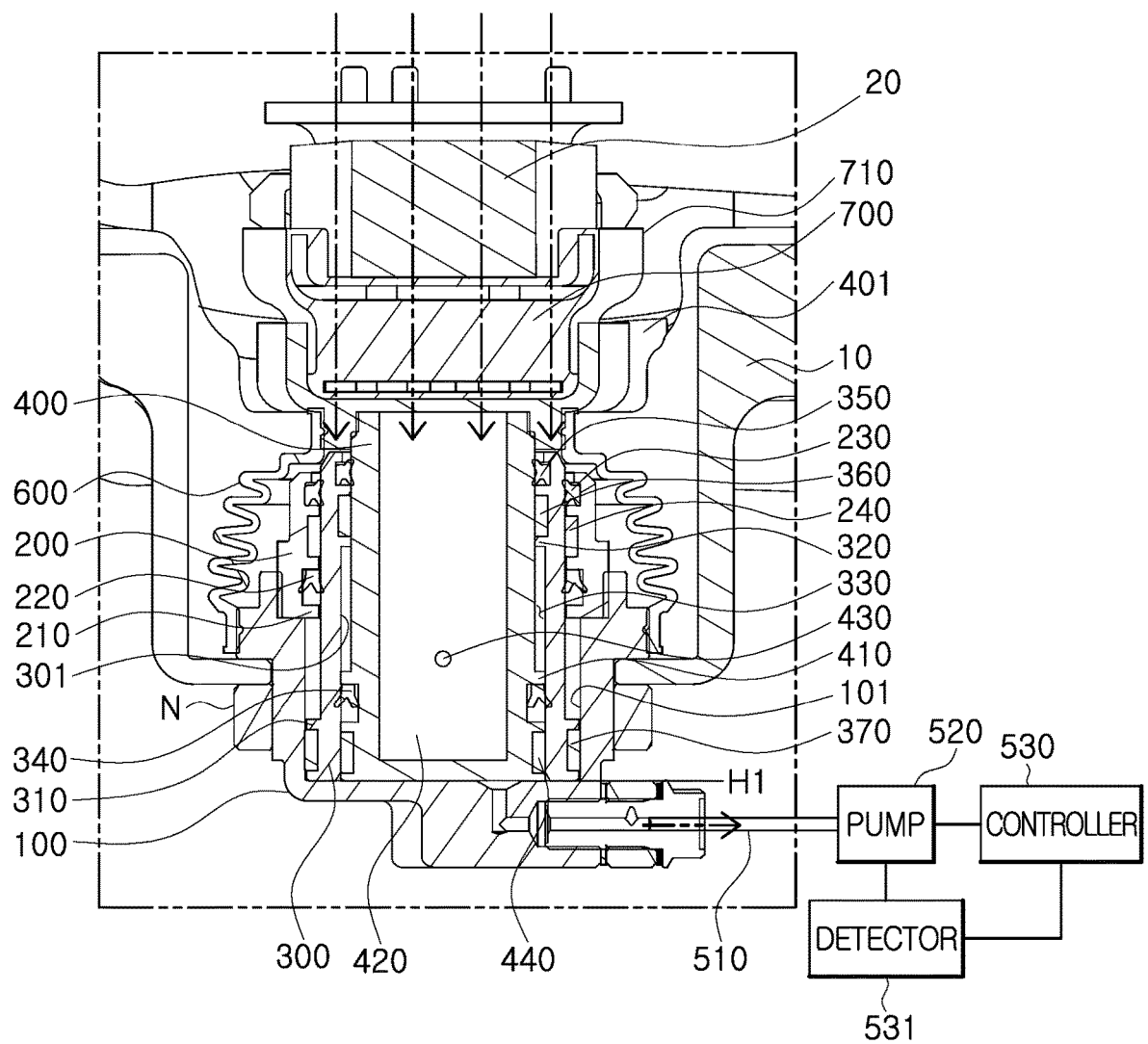
FIG. 10 is a cross-sectional front view illustrating a state in which the first and second pistons are moved downward to the reference height in the apparatus for adjusting a vehicle height according to the embodiment of the present disclosure.

FIG. 8 is a cross-sectional front view illustrating a state defined before the first piston, which has moved upward to the first height, and the second piston, which has moved upward to the second height, move downward in the apparatus for adjusting a vehicle height according to the embodiment of the present disclosure, FIG. 9 is a cross-sectional front view illustrating a state in which the second piston is moved downward to the first height in the apparatus for adjusting a vehicle height according to the embodiment of the present disclosure, and FIG. 10 is a cross-sectional front view illustrating a state in which the first and second pistons are moved downward to the reference height in the apparatus for adjusting a vehicle height according to the embodiment of the present disclosure.

Referring to FIGS. 8 to 10, when the pump 520 eliminates the pressure, i.e., when the working fluid in the pressure chamber 101 is discharged to the outside through the working fluid transmission line 510, the first piston 300 and the second piston 400 move downward as a load of the vehicle is applied thereto in the state in which the pressure generated in the lower portion of the pressure chamber 101 is eliminated.

For example, when the working fluid, which has been provided to generate the secondary pressure in the pressure chamber 101, is discharged to the outside from the pressure chamber 101, the second piston 400 moves downward from the second height H3 to the first height H2. Further, when the working fluid, which has been provided to generate the primary pressure in the pressure chamber 101, is discharged to the outside from the pressure chamber 101, the first piston 300 and the second piston 400 move downward together to the reference height H1.

The detector 531 measures the value of the current vehicle height. Therefore, when the vehicle height decreases and reaches a desired position, the driver may stop the decrease in vehicle height at the corresponding position by controlling the operation of the pump 520 by using the controller 530.

Figure 4:
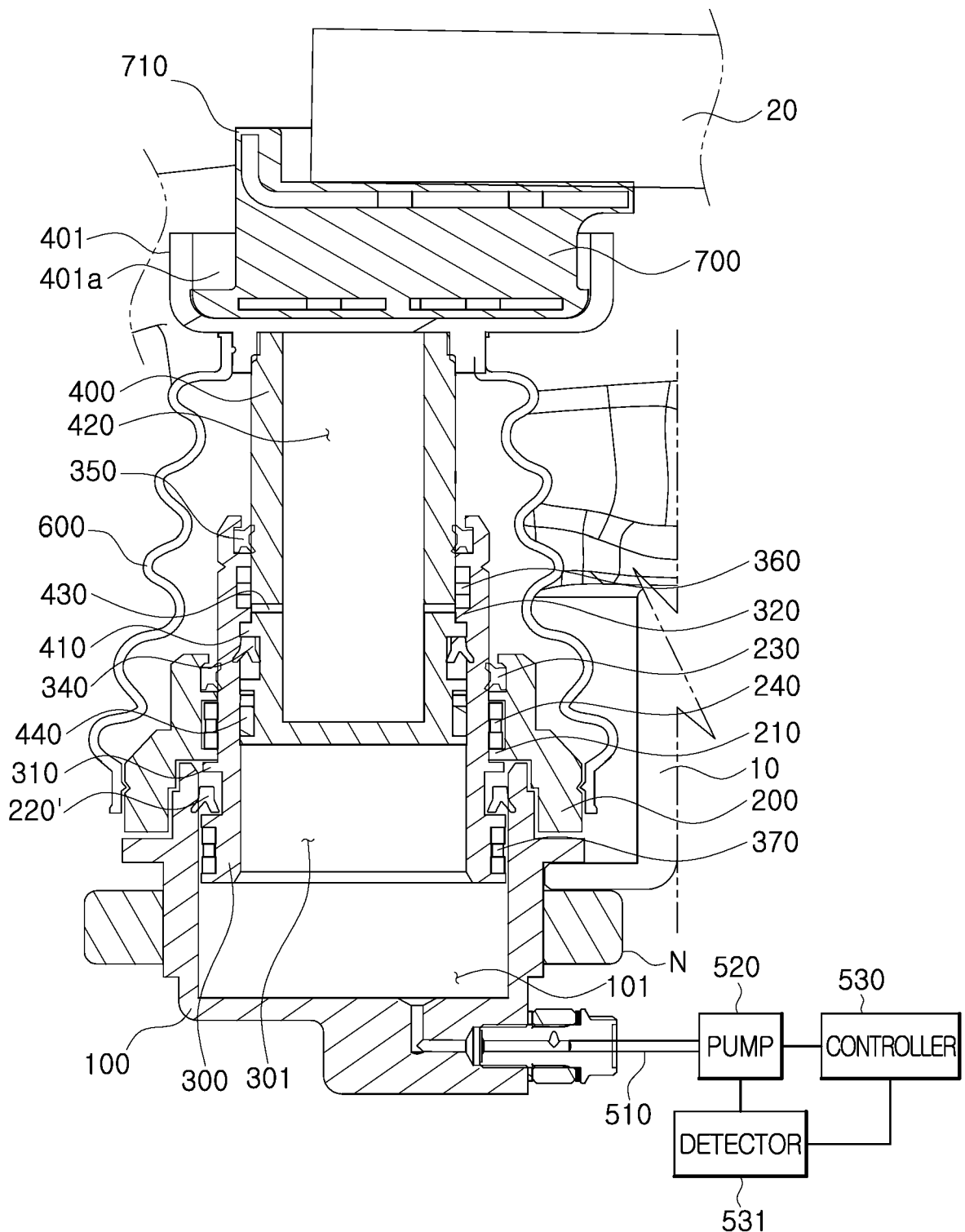
FIG. 4 is a cross-sectional side view illustrating an apparatus for adjusting a vehicle height according to another embodiment of the present disclosure.

FIG. 4 illustrates an apparatus 1 for adjusting a vehicle height according to another embodiment of the present disclosure. The description of contents related to another embodiment identical to the contents related to the above-mentioned embodiment will be omitted.

Referring to FIG. 4, an outer hydraulic seal 220' may have a ring shape. The outer hydraulic seal 220' may be positioned below the first stopper 310 and provided outside the first piston 300. In this case, a difference between an inner area of the first piston 300 and an inner area of the second piston 400 may further increase.

The outer hydraulic seal 220' may be manufactured by using a material such as rubber and installed between the cylinder 100 and the first piston 300. A concave installation groove may be formed in the outer surface of the first piston 300 and accommodate the outer hydraulic seal 220'.

The outer hydraulic seal 220' moves upward or downward together with the first piston 300. The outer hydraulic seal 220' provides a sealing structure, which may prevent hydraulic pressure from leaking between the cylinder 100 and the first piston 300. The outer hydraulic seal 220' may serve as a hydraulic seal.

In another embodiment illustrated in FIG. 4, the outer hydraulic seal 220' is disposed on the first piston 300 and moves together with the first piston 300, and the inner hydraulic seal 340 is disposed on the second piston 400 and moves together with the second piston 400. In contrast, in the embodiment illustrated in FIG. 3, the outer hydraulic seal 220 is fixed inside the cylinder cap 200, and the inner hydraulic seal 340 is disposed on the second piston 400 and moves together with the second piston 400. In addition, the outer hydraulic seal and the inner hydraulic seal may be disposed to be fixed in position when the first piston 300 or the second piston 400 moves upward or downward.

The cylinder cap 200 may be fixedly coupled to the upper end of the cylinder 100. The cylinder cap 200 has a hollow shape and has a structure opened in the upward/downward direction. An inner peripheral portion of the lower end of the cylinder cap 200 may be mounted on an outer peripheral portion of the upper end of the cylinder 100.

The apparatus 1 for adjusting a vehicle height according to the embodiment of the present disclosure may adjust the vehicle height to various levels (low, middle, and high levels) and have the volume reduced through a telescopic structure, which makes it possible to reduce interference with the suspension structure. Further, the apparatus 1 may ensure the operating performance because no excessive pressure is generated between the first piston 300 and the second piston 400 at the time of adjusting the vehicle height.

While the present disclosure has been described with reference to the exemplary embodiment depicted in the drawings, the exemplary embodiment is for illustrative purposes only, and those skilled in the art to the present technology pertains will understand that various modifications of the exemplary embodiment and any other exemplary embodiment equivalent thereto are available. Accordingly, the true technical protection scope of the present disclosure should be determined by the appended claims.

What is claimed is:

1. An apparatus for adjusting a vehicle height, the apparatus comprising:
   a cylinder coupled to a suspension arm and having a pressure chamber therein;
   a hollow cylinder cap coupled to the cylinder;
   a first piston disposed to be movable upward or downward in the pressure chamber and having a lifting hole portion penetratively formed therein;
   a second piston disposed to be movable upward or downward in the lifting hole portion and having an upper portion to which a leaf spring seating part on which a leaf spring is seated is coupled; and
   a height adjustment unit connected to the cylinder and configured to selectively adjust a height of any one of the first piston and the second piston by changing a pressure of a working fluid in the pressure chamber.

2. The apparatus of claim 1, wherein the height adjustment unit is configured to provide primary pressure into the pressure chamber so that the first piston and the second piston move upward to a first height, and the height adjustment unit is configured to provide secondary pressure into the pressure chamber so that the second piston moves upward to a second height higher than the first height.

3. The apparatus of claim 2, wherein a stopper protrudes from an outer surface of the first piston, and a catching projection is formed on an inner surface of the cylinder cap and is configured to restrict an upward movement of the stopper when the first piston is moved upward to the first height.

4. The apparatus of claim 3, further comprising:
   a ring-shaped outer hydraulic seal positioned above the catching projection and inside the cylinder cap,
   wherein the outer hydraulic seal is installed between the cylinder cap and the first piston.

5. The apparatus of claim 3, further comprising:
   a ring-shaped outer hydraulic seal positioned below the stopper and outside the first piston,
   wherein the outer hydraulic seal is installed between the cylinder and the first piston and configured to move upward or downward together with the first piston.

6. The apparatus of claim 2, wherein a stopper protrudes from an outer surface of the second piston, and a catching projection is formed on an inner surface of the first piston and is configured to restrict an upward movement of the stopper when the second piston is moved upward to the second height.

7. The apparatus of claim 6, wherein a first accumulator is disposed between the first piston and the second piston, and a second accumulator is formed inside the second piston and connected to the first accumulator through a passageway so that air flows between the first accumulator and the second accumulator.

8. The apparatus of claim 7, wherein the first accumulator is disposed in a section between the stopper and the catching projection.

9. The apparatus of claim 6, further comprising:
a ring-shaped inner hydraulic seal positioned below the stopper and provided outside the second piston,
wherein the inner hydraulic seal is installed between the first piston and the second piston and is configured to move upward or downward together with the second piston.

10. The apparatus of claim 6, further comprising:
a ring-shaped inner dust seal positioned above the catching projection and provided inside the first piston,
wherein the inner dust seal is installed between the first piston and the second piston and configured to move upward or downward together with the first piston.

11. The apparatus of claim 1, further comprising:
a ring-shaped outer dust seal provided inside the cylinder cap and positioned above the cylinder cap,
wherein the outer dust seal is installed between the cylinder cap and the first piston.

12. The apparatus of claim 1, wherein the height adjustment unit comprises:
a working fluid transmission line connected to the cylinder and configured to allow the working fluid to flow therethrough;
a pump configured to supply the working fluid to the pressure chamber or discharge the working fluid from the pressure chamber through the working fluid transmission line; and
a controller configured to control an operation of the pump.

13. The apparatus of claim 12, wherein a detector is electrically connected to the controller and configured to detect pumping pressure of the pump.

14. The apparatus of claim 1, comprising:
a bushing member installed on an inner surface of the cylinder cap and disposed to be in close contact with an outer surface of the first piston.

15. The apparatus of claim 1, wherein:
a first guide member is provided on an inner surface of the first piston, disposed to be in contact with an outer surface of the second piston, and configured to move upward or downward together with the first piston, and
a second guide member is provided on an outer surface of the first piston, disposed to be in contact with an inner surface of the cylinder, and configured to move upward or downward together with the first piston.

16. The apparatus of claim 1, wherein a guide member is provided on an outer surface of the second piston, disposed to be in close contact with an inner surface of the first piston, and configured to move upward or downward together with the second piston.

17. The apparatus of claim 1, wherein a dust cover is coupled between an upper end of the cylinder and a lower end of the leaf spring seating part and configured to be variable in vertical length, the dust cover being configured to surround a periphery of the second piston, a lower end of the dust cover is coupled to the upper end of the cylinder, and an upper end of the dust cover is coupled to the lower end of the leaf spring seating part.

18. The apparatus of claim 1, wherein a lateral end of the leaf spring seating part protrudes toward a lateral portion of the second piston, and a seating groove portion is formed concavely downward inside the leaf spring seating part.

19. The apparatus of claim 18, further comprising:
a leaf spring bushing accommodated in the seating groove portion, installed between the leaf spring seating part and the leaf spring, and configured to elastically support the leaf spring.

20. The apparatus of claim 19, comprising:
a bushing rib protruding upward along a rim of an upper surface of the leaf spring bushing and configured to surround an outer surface of a free end of the leaf spring.

\* \* \* \* \*